H. K. HARRIS.
DEVICE FOR MAKING PUBLIC ANNOUNCEMENTS AND EXHIBITING ADVERTISEMENTS.
APPLICATION FILED MAR. 24, 1916.

1,200,437.

Patented Oct. 3, 1916.
9 SHEETS—SHEET 1.

INVENTOR
Henry K. Harris
BY
ATTORNEYS

H. K. HARRIS.
DEVICE FOR MAKING PUBLIC ANNOUNCEMENTS AND EXHIBITING ADVERTISEMENTS.
APPLICATION FILED MAR. 24, 1916.

1,200,437.

Patented Oct. 3, 1916.
9 SHEETS—SHEET 4.

INVENTOR
Henry K. Harris
BY
ATTORNEYS

H. K. HARRIS.
DEVICE FOR MAKING PUBLIC ANNOUNCEMENTS AND EXHIBITING ADVERTISEMENTS.
APPLICATION FILED MAR. 24, 1916.

1,200,437.

Patented Oct. 3, 1916.
9 SHEETS—SHEET 6.

INVENTOR
Henry K. Harris
BY
ATTORNEYS

H. K. HARRIS.
DEVICE FOR MAKING PUBLIC ANNOUNCEMENTS AND EXHIBITING ADVERTISEMENTS.
APPLICATION FILED MAR. 24, 1916.

1,200,437.

Patented Oct. 3, 1916.
9 SHEETS—SHEET 7.

INVENTOR
Henry K. Harris
BY
ATTORNEYS

H. K. HARRIS.
DEVICE FOR MAKING PUBLIC ANNOUNCEMENTS AND EXHIBITING ADVERTISEMENTS.
APPLICATION FILED MAR. 24, 1916.

1,200,437.

Patented Oct. 3, 1916.
9 SHEETS—SHEET 8.

Fig.25.

INVENTOR
Henry K. Harris
BY
ATTORNEYS

Fig. 28.

UNITED STATES PATENT OFFICE.

HENRY KINGSFORD HARRIS, OF WESTMINSTER, LONDON, ENGLAND.

DEVICE FOR MAKING PUBLIC ANNOUNCEMENTS AND EXHIBITING ADVERTISEMENTS.

1,200,437. Specification of Letters Patent. Patented Oct. 3, 1916.

Application filed March 24, 1916. Serial No. 86,372.

*To all whom it may concern:*

Be it known that I, HENRY KINGSFORD HARRIS, a subject of the King of England, residing at 96 Victoria street, Westminster, London, England, have invented certain new and useful Improvements in Devices for Making Public Announcements, Exhibiting Advertisements, and for other Purposes of a like Nature, of which the following is a specification.

This invention relates to devices for making public announcements, exhibiting advertisements and for other purposes of a like nature, and refers to an improved device of the class in question by means of which any required letters, signs, numerals or the like can be formed in a simple and effective manner for the purpose of producing the desired announcements or the like.

According to the general principle of my invention, I provide in a suitable framing any desired number of plates, rollers, strips, bands or the like which are so arranged and if necessary colored, that when some of them are brought or turned into suitable positions or combined in a suitable manner, preferably in connection with an appropriately tinted background, they make up the required letters, signs, numerals or other devices, and I provide means for turning or bringing the plates or other devices into the required positions, which means may be operated by electrical or other devices, locally or from a distance.

In the preferred method of carrying out the invention, as applied for instance to a device for making public announcements, I provide a series of frames, or units corresponding in number to the number of letters or other symbols which I may desire to exhibit at one time. Each of the units is provided with one or more plates, which I term mask plates, and which are adapted to form a background of the letter. I also provide a series of plates, strips, bands or other like devices each of such plates, strips or the like being adapted to form the whole or a portion of a letter, and I provide for each of the plates, strips or the like actuating mechanism adapted to move the corresponding plates or the like in a plane substantially parallel to the exhibiting plane, and in such a way that in one position the strip or the like is concealed from view behind the framing of the unit, the mask plate or the like, while in another position or in other positions it is brought into view and adapted either alone or in conjunction with another of the plates, strips, bands or the like to form a letter or a portion of a letter or other sign which it is required to represent. The movement of the various plates or the like is preferably controlled by levers attached to them and connected to rods, which rods are operated by a drum, plate or bar jacquard the position of which may be determined in any suitable manner for instance by means of a selector which causes it to be set in any one of the required positions for operating any set of rods to produce the required indications. The position of the selecting device may be determined by means of electrical or pneumatic impulses, and by any of the transmitting apparatus described in some of my former British patents, for instance 27793, dated 10th February 1912, 4635 dated 24th February 1913, 9725 dated 3rd July 1915 or by other suitable means. Where a selector is used the apparatus is preferably so constructed that the selecting device in each unit may be set for the next indication while the indicators are exhibiting. In this case, when the selectors in the letter units have been set a push bar, solenoid, pneumatic piston or other analogous device may cause the operation of the mechanism for bringing the plate or the like into position. A convenient form of jacquard for use in connection with an indicating unit of the class under consideration is a jacquard drum which is provided with a number of perforations, recesses or the like into which spring-controlled or other pins, operating the lever or other equivalent mechanism controlling the plates or the like are adapted to drop when they come opposite such perforations or the like. Appropriate means are added for removing the pins or the like from the jacquard when a fresh setting is to be effected.

In order that my said invention may be better understood, I will now proceed to describe the same with reference to the accompanying drawings in which:—

The same numerals of reference are employed to denote the same parts in all the views.

Referring first to the diagram shown in Figs. 1 to 8—in these views 11 shows a rectangular plate provided with an aperture 12. The plate 11 forms the front of a rectangular casing extended backward for some distance and containing the various moving strips, slats and the like and the mechanism therefor. The outer surface of the plate 11 is preferably of a dark color or black, and will hereafter be called "the outer mask plate". An inner mask plate 13 is provided, within the casing, of a size slightly greater than that of the aperture 12 and located in a plane just behind the plane of the plate 11 suitable supporting means being provided for holding it in this position. This supporting means is so formed and arranged that free space is left around the outer edges of the inner mask plate 13 and beneath the plate 11 for the accommodation of strips, etc., of various shapes, so that they are out of sight, but capable of being moved so that they are exposed to view by being brought into the space or aperture 12 in front of the plate 13. The strips, etc., or those portions of them which it is desired to render visible are preferably of a distinctive color or painted white, so that they may show up clearly by contrast with the light or dark mask plates. The strips, etc., may be provided to any desired number, and of any desired shape and located in such planes that neither they nor their operating mechanisms foul one another when brought into action, either simultaneously or consecutively, and may when required have balance weights so that the action may be very light. For the sake of clearness in Figs. 1 to 8, various strips, etc., and their operating mechanisms are shown separately, although it will be understood, that in practice all the required number of strips and mechanisms necessary to make up the required combination of letters, signs or numbers are located in one casing or unit, it being simply necessary to so locate the parts, as previously stated that the strips, etc., and the operating mechanisms are free to move in the desired positions and do not foul each other.

Figure 1:
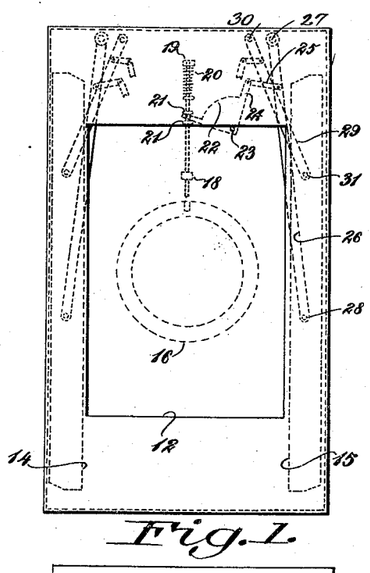
Figures 1 to 16 are diagrams illustrating the principles of the invention.
Figure 2:
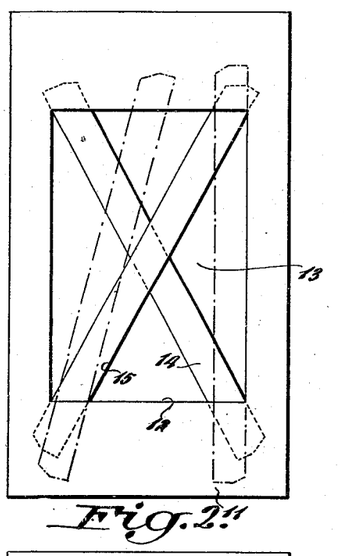
Figure 17:
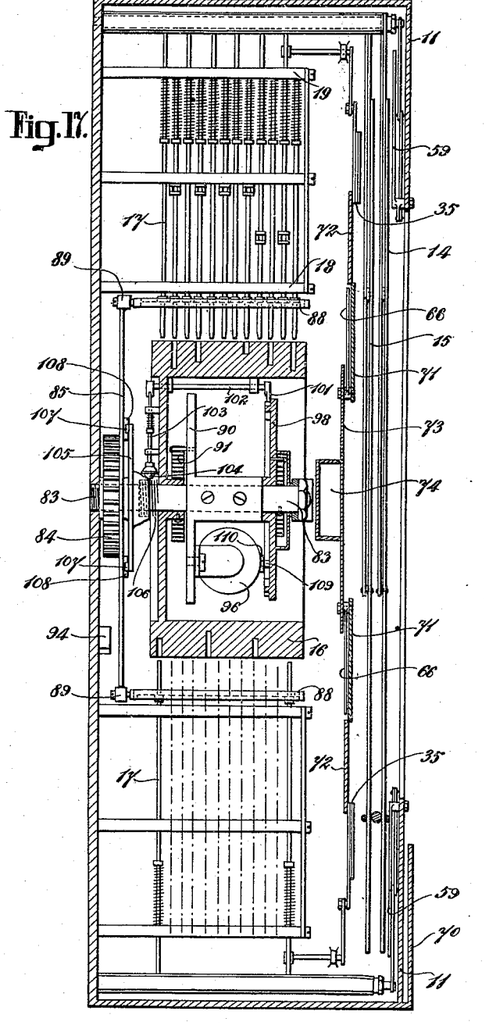
Fig. 17 is a sectional view of one sort of unit, illustrating the method of control.

Referring to Figs. 1 and 2, in which Fig. 1 shows in dotted lines two long strips 14 and 15 and their controlling mechanism, the strips being in the "out of sight" position, while in Fig. 2 the strips are shown in full lines in one of the many positions which they may be caused to assume, and in dot and dash lines in other positions. 16 is a jacquard in the form of a drum which will be more fully described hereafter in connection with Fig. 17, although it will be understood that, any convenient form of jacquard or equivalent device may be used. The drum 16 is provided with a series of holes in its surface, in any predetermined order and of any required depth. 17 is a rod or needle capable of sliding in bearings 18 and 19 suitably secured to the casing. This rod 17 is kept pressed downward by a compression spring 20. 21 are two bosses or rollers on the rod 17 between which the forked ends of a quadrant lever 22 take. The quadrant lever is pivoted to a fixed point 23, and its other end 24 is connected to a link 25, in turn pivoted to a long lever 26. The long lever 26 is mounted on a sleeve turning upon a suitable post 27 and connected at its other end to a pivot 28 on the under side of the strip 15. 29 is another lever likewise pivoted on a post 30 at one end, and at the other end to a pivot 31 on the under side of the strip 15. The lever 29 is in mechanical connection with a jacquard needle, through a mechanism similar to that just described. One of the pivots 28 or 31 is preferably mounted so that it can slide, either by mounting the pivot pin upon a sliding plate carried by the lever, or by a pin and slot connection. When therefore, the jacquard has been set into a suitable position and the jacquard pins or needles are allowed to spring inward, it will be seen that the strip 15 will be set into a certain position according to the extent of movement allowed, or in other words according to the depths of the holes in the roller 16. The strip 14 is controlled by mechanisms similar to those just described with reference to the strip 15, and, therefore, both the strips 14 and 15, which it is to be observed are moving in different planes, can be set either alone or in combination with other strips or pieces into certain desired positions, according to the positions and depths of the holes or their equivalents upon a jacquard. In reference to Fig. 2, it will be seen that the letter X has been formed in full lines, while the dot and dash lines indicate other positions of the strips. On examination of the figures it will be seen that the strips 14 and 15 may be set either separately or together so as to be vertical and form a part of such letters or numerals as M, P, I, J, 4, etc., or they may be inclined in either direction and form part of such letters or numerals X, A, W, 7, etc.

Figure 3:
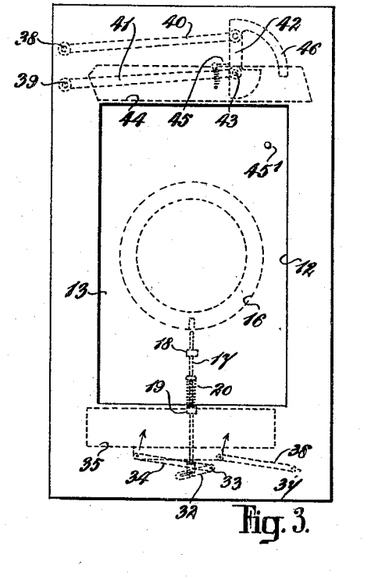
Figure 4:
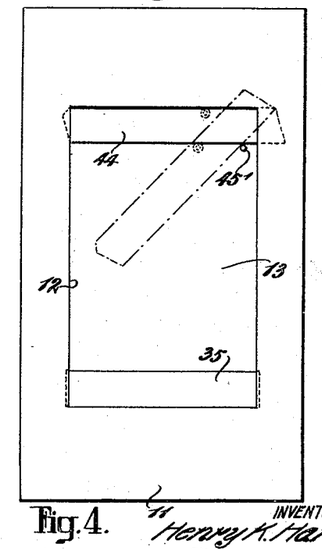

Referring to Figs. 3 and 4, and taking first the lower portion of the mechanism, in this case a jacquard needle 17 is shown working in bearings 18 and 19 and controlled by a compression spring 20. The needle is, however, in this case extended backward and connected to a slotted lever 32 pivoted or being mounted on a sleeve on a fixed pivot or rod 33. The lever 34 is mounted on the same sleeve 33 and at its other end pivoted to a strip 35. 36 is a lever similar to the lever 34 and pivoted at 37 to the casing, the levers 34 and 36 and the strip 35 forming a parallel link motion. The strip 35 is similar to the strips 14 and 15 in that it is of distinctive coloring with regard to the mask plate. When the jacquard needle is caused to move, the said strip 35 is brought into the position shown at Fig. 4. It is to be observed that a similar strip may be and is preferably provided at the top. These strips can be utilized to form portions of such letters or numerals as B. L. F. T. 5. In large units the back or out of sight portions of these levers may be extended if necessary to give additional support, or extra support may be furnished, on the levers themselves, and in general any advantageous guiding or supporting means may be adopted in connection with the strips or slots, the levers or other moving parts. At the upper portion of Figs. 3 and 4 is shown a strip which may be set into a horizontal or inclined position. 38 and 39 are fixed pivots to which are pivoted levers 40 and 41, in turn pivoted to a bar or the like 42. The bar 42 carries, at its lower part a pivot 43 for a white or other siutably tinted strip 44. It will be understood that when the jacquard needle operates a suitable lever connection (not shown in the drawing) the strip 44 can be brought into the position shown in Fig. 4 in full lines. 45 is an arm projecting from the side of the bar 42 to which one end of a tension spring is connected or this may be reversed and placed at the end behind the frame plate so as to be out of sight. The other end of the spring is connected to the under side of the strip 44. 45¹ is a stop on the outer side of and of the same color as the inner mask plate 13. 46 is an additional guide, which may be forked. If the hole in the jacquard drum is of such depth that the parallel link motion, if unhindered, would bring the strip into a position lower than that shown in full lines in Fig. 4 then, owing to the stop 45¹, the strip 44 is turned into an angular or inclined position, the exact angle depending upon the depth of the slot. When the strip takes up this angular position, some part of the support comes within the aperture 12 and would therefore, become visible. To obviate or counteract this in the present and other cases where it occurs, the undesirable exposed portion or portions of the mechanism are colored in a similar manner to the mask plate, thus rendering them practically invisible when contrasted with the white or lightly colored strip. A strip such as 44 need only be provided at one of the top and bottom corners of the aperture 12 and form the reëntrant portion of such letters or the like as M or W, as well as the horizontal strip for letters, etc., such as B, F, L, T, 5.

Figure 5:
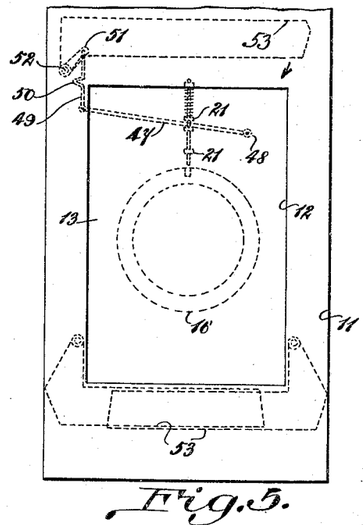
Figure 6:
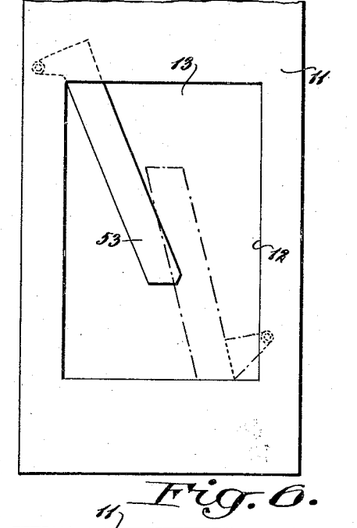

In reference to Figs. 5 and 6 where the upper and lower strips are shown, which are only capable of being given an angular setting, the jacquard needle is practically similar to that shown in Fig. 1 and controls a lever 47 which passes between the collars or projections 21. This lever 47 is pivoted at 48 at one end and connected at the other end to a link or rod 49 provided with a bent portion 50 to facilitate adjustment. The link or rod 49 is connected to the lever 51 pivoted to a fixed pivot 52 and controlling the movement of a whitened or other strip 53. In place of a lever, like 47, I may use a lever and lever movement as shown at 32 in Fig. 3, as several of these movements can be mounted on the same pivot rod 33, the sleeves being over one another. An arrangement of this nature, Figs. 5 and 6, may be provided at each corner, and the strips may take up positions such as those indicated at Fig. 6. A very desirable arrangement of the horizontal strips is one in which there is provided, at the top on one side a mechanism and strip such as 44 (Figs. 3 and 4) and on the other side a mechanism and strip such as 53 (Figs. 5 and 6) a similar combination being also provided at the bottom. In this way although only four strips are employed it is possible to get horizontal strips both at the top and bottom and also to have single or double angular strips either at the top or bottom. It will be observed from Figs. 5 and 6 that the position of the pivots with respect to the aperture and with respect to the strip is different at the bottom from that shown at the top. This allows the reëntrant portion of the letter W to be formed correctly.

Figure 7:
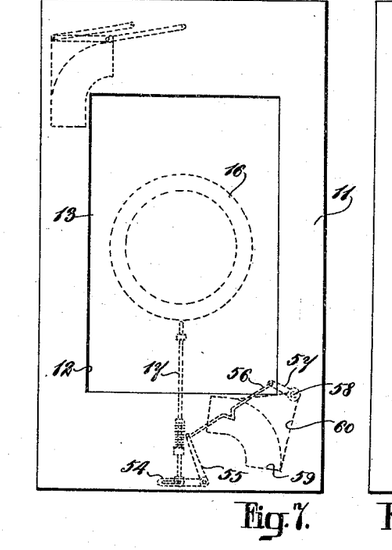
Figure 8:
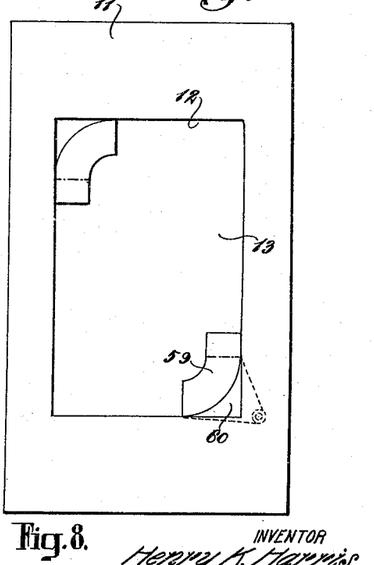

Figs. 7 and 8 show one method of arranging the corner curves. The jacquard needle 17 is somewhat similar to that described in connection with the lower portion of Fig. 3. It will be seen that the lower end is connected to the slotted arm 54 of a two armed lever, the other arm 55 of which is connected to an adjustable link or rod 56 in turn connected to a lever 57 pivoted at 58 and controlling the movement of a piece 59 shaped as shown. The portion 60 of this piece is of a similar color to the mask plate, the other portion being white or of the same shade as the other strips. When the jacquard needle is allowed to move the piece 59 is turned into the position shown at Fig. 8. One of these pieces is provided at each corner, and they help to form a large number of letters or numerals. In some cases these corner curves may be short or long in either the horizontal or vertical directions, short or long corner curves being provided according to the combination of pieces employed in the particular unit. At the upper portion of Fig. 7 is shown a parallel link motion which may be used for actuating the corner curves, and specially suitable for curved pieces with an extended straight portion, motion being imparted to the mechanism through suitable levers or the like controlled by a jacquard needle in a manner similar to that already described with reference to the other parallel link motions. The inner plate 13 may be made up of portions coming in different planes, as may also the outer plate 11, thus greatly increasing the utility of the invention.

Figure 9:
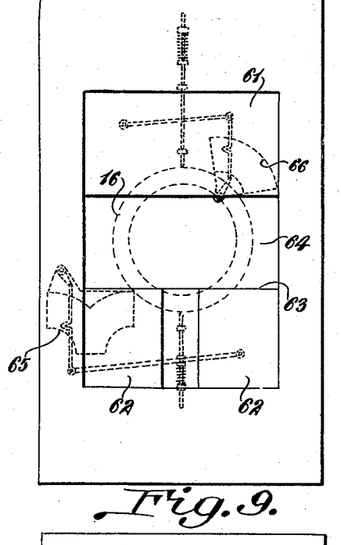
Figure 10:
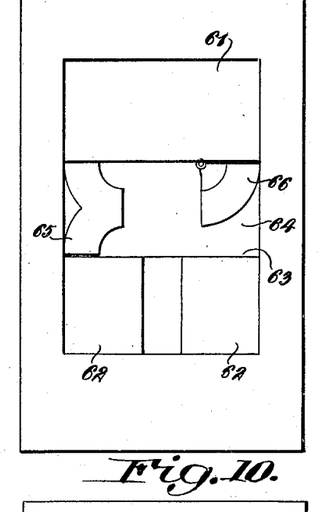
Figure 11:
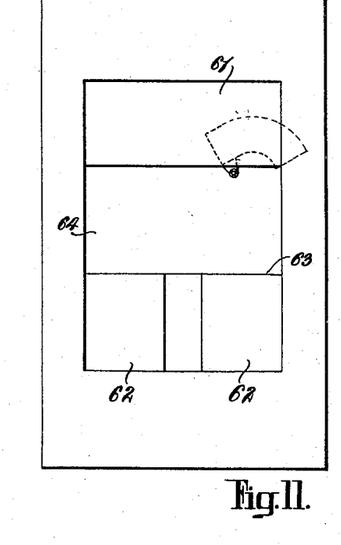
Figure 12:
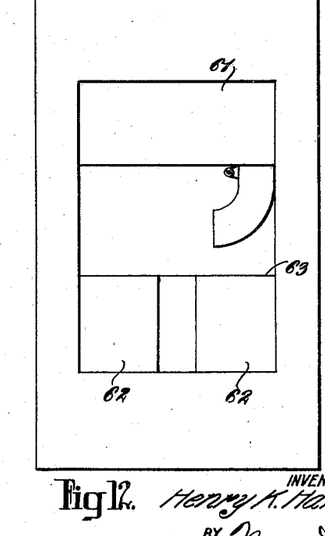
Figure 13:
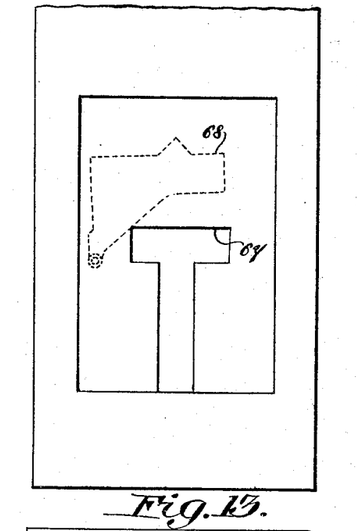
Figure 14:
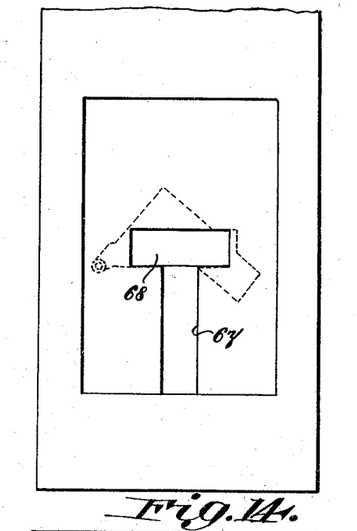
Figure 15:
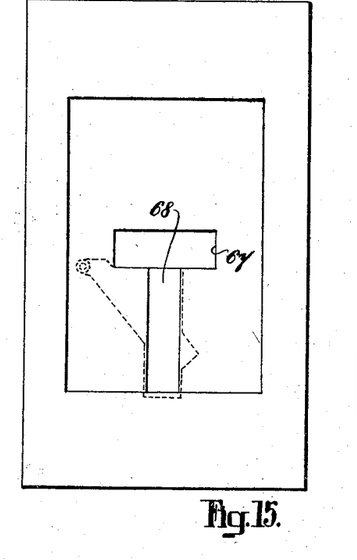
Figure 16:
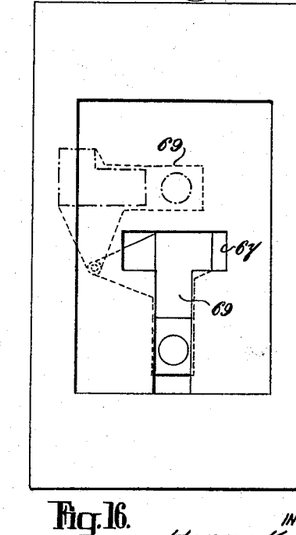

In Figs. 9 to 12, which show similar diagrams to those shown in Figs. 1 to 8, the inner mask plate is made in three portions. 61, 62 are the top and bottom portions and come in about the same plane as the inner mask plate 13 described in connection with Figs. 1 to 8. Behind the aperture 63 left between these two portions 61 and 62, is a third portion 64 of slightly larger size than the said aperture. The space between the portions 61 and 64 and 62 and 64 is quite free to allow various strips, etc., to be turned into position and thus become visible. The inner space is utilized in the construction as shown in Figs. 9 to 12, for the accommodation of the middle curves or angles, which may be either single as shown at the right hand side of Fig. 10, or double as shown at the left hand side of the same figure. These middle curves or angles whether single or double, may be long or short in the horizontal and vertical directions as the particular circumstances require. The lower portion of Fig. 9 shows a jacquard needle and associated mechanism similar to that described with reference to the piece 59, Fig. 7, and it will be obvious that when the needle is allowed to move, the middle curve 65, in this case a double one, will be set into the position shown in Fig. 10. A middle curve of this description may also be set at the other side. In most cases in place of double middle curves, I prefer to use two single curved pieces one on each side of a horizontal line that is four pieces which are used singly or in combination. These are, in this case, located in slightly different planes so that they can move over one another. One form of this arrangement is shown in the upper portion of Fig. 9, where a single middle curve 66 is provided which when its jacquard needle moves inward is brought into the position shown at the right hand side of Fig. 10. Figs. 11 and 12 show the two positions of long single middle curved pieces. The middle pieces are employed in such letters and numerals as B, P, R, S, 3, 6, 8, 9, which are made up in conjunction with other pieces and strips, the exact number and description of the pieces depending upon whether the curved pieces are long or short, single or double, and what other straight pieces are used. Provision is made for this in the following manner, as shown at Figs. 13 to 16: The inner mask plate is cut away at 67 in the form of a T as shown and another mask plate is arranged behind this cut away portion and at a somewhat lower level. Through the space thus left between the plates, a specially shaped piece 68 is adapted to work. This piece can be set in three positions, the "out of sight" position shown in Fig. 13, the first visible position as shown in Fig. 14, and the second visible position, as shown at Fig. 15. The piece 68 is white or of light color and, therefore, in the position illustrated at Fig. 14 would form a dash or the middle member of the letter E, etc., while in Fig. 15 a vertical bar is seen to be used for the upright of a Y, etc. This same T-shaped opening can be utilized for a specially marked plate 69, see Fig. 16, forming part of a note of exclamation, the dot and upper portion being marked out for instance in white on the dark plate. Jacquard needle mechanism of a type similar to those already described or of other appropriate type may be used for operating any of the aforesaid pieces just described.

Specially shaped pieces and plates may in some cases be used to facilitate the formation of particular letters or signs. For instance a piece may be furnished for forming the right angled back portion of the numeral 5 where a short center dash is provided and another piece for forming the front part of the letter G and these pieces may be operated in the same manner as the center curved pieces and in some cases they may be mounted upon the same centers as such curved pieces, special sleeve bearings being provided.

I prefer in some instances to use two right angled pieces one beneath and rotatable about the same axis as the upper middle left hand curved piece and another under the bottom lower middle right hand curved piece, these pieces being adaptable for joining the central dash with the vertical side members for making up such letters as H, E, F, etc. The tail of the Q may again be provided on a special piece and will preferably be accommodated beneath a small mask plate in front of and at the right hand bottom corner of the outer mask plate 11, and accents for French, etc., are accommodated in the same manner at the top or bottom. For the formation of some letters, numerals or signs it may be advantageous to connect the operating mechanism of the parts in question.

The parts to be moved are not of necessity whitened or light portions, but may in some cases be dark plates adapted to cover in a portion or portions of another part which is white or of light color.

The letters of the alphabet, the numerals and some signs may be made up generally speaking from the pieces already described, although in some cases it may be necessary to provide additional pieces or it may be desirable to use such additional pieces in order to obtain a better result. It will be evident upon consideration that the same letter or the like may in some cases be made up in more than one way, and this is more particularly the case where the letters or the like include corner and/or middle curves which curves, may as already described, be long or short in either or both the vertical and/or horizontal directions. The number of pieces for providing the ordinary letters, numerals and signs will, therefore, vary in the units according to the kinds of curves, etc., employed. It should be observed that the best results are obtained in practice by keeping the planes of the various parts as close together as possible.

Referring now to Fig. 17, which shows a cross section of a unit illustrating an advantageous manner of arranging the moving parts and operating mechanism, it will be observed that the outer mask plate 11 is provided at the bottom and at the outside with a small mask plate 70 for masking the tail of the letter Q when not in use. Immediately beneath the plate 11 are arranged the corner curved plates 59 and their actuating mechanisms. Next in order are the long strips 14 and 15 with their double lever controls. A little way behind the strip 15, portions 71 of the inner mask plate will be seen, stepped back at 72 to take the sliding end plates say 35. The middle curves say 66 come behind the portions 71 and can be turned in front of the portion 73 of the mask plate. In the case under consideration a space or housing 74 is left to accommodate a special mechanism forming the middle horizontal member which may also be used, although not shown forming the middle portion of the horizontal member. This mechanism is shown in cross sectional plan in Fig. 23, the top portion being the outside or visible portion. 75 are angularly arranged mask plates fixed in position across the opening 74. 77 are four inclined rods. 78 is a rod provided on its underside with guides 79 and notched on its upper face to carry the turned over portions of inclined plates 80, coming beneath the plates 75. 81 is a roller working upon a pivot carried by the rod 78, which roller is engaged by the forked end 82 of a lever controlled suitably as before from a jacquard needle. The plates 80 are whitened on the upper surface and when the mechanism is operated they slide from behind the plates 75 and become visible, presenting the appearance of a strip. This mechanism is capable of variation, so that when a short movement is taking place, only a short continuous strip is formed while when a further movement takes place a long strip is formed. As will be apparent, other variations in this movement may be readily devised for producing different effects. Where this type of device is used for the horizontal middle member, a similar one may be employed for the vertical in the T shaped opening in the mask plate.

Figures 18, 19, 20, 21, 22, 23:
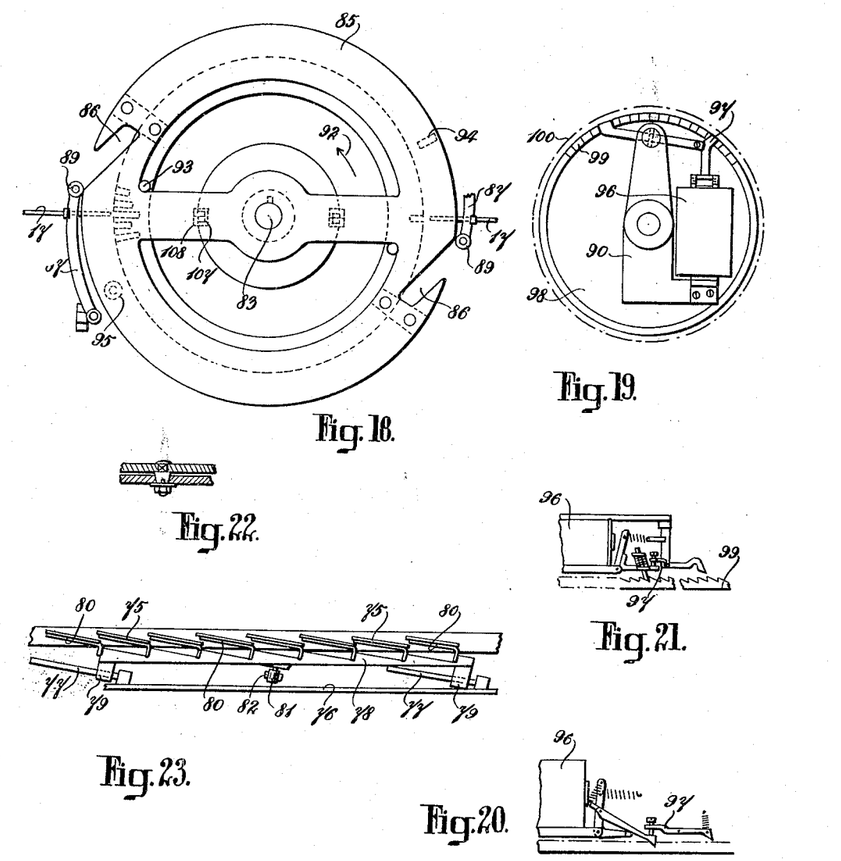
Figs. 18 and 19 show portions of same in front elevation.
Fig. 20 shows a fragmentary end view of Fig. 19.
Fig. 21 shows a modified form of the mechanism illustrated in Fig. 20.
Figs. 22 and 23 are enlarged details of construction.

The preferred method of pivoting the levers to the strips or the like is shown at Fig. 22, where it will be seen that a coned pin is used thus allowing wear to be taken up. This may be with or without a nut. The coned pin is shown slotted to take a tongued washer.

The general arrangement of the jacquard drum 16 and the pins 17 will be seen from Fig. 17 where a certain number of pins are shown at the top and bottom, although I do not wish to limit myself to this number or arrangement. The drum 16 may be made from one piece or it may be built up from stampings. As will be readily understood it must be provided with rows of perforations in such positions and of such depth that when it is set in a certain position the pins come opposite to and enter the holes, thus operating the various mechanisms to set certain strips or pieces into position to form the letter, numeral or the like required. The sets of holes for the different letters, etc., may be arranged in the mathematical order of frequency in which they occur.

83 is a fixed spindle suitably supported in the casing upon which is freely mounted the gear wheel 84. This gear wheel is operated when required by a rack or the like actuated by a solenoid or piston action. The gear wheel 84 carries a setting wheel 85 formed with gaps or notches 86.

87 are hinged lever plates having slots 88, through which the jacquard needles pass. These needles are furnished with bosses which take against the lever plate 87 and prevent the ends of the needles entering the holes in the jacquard drum until the gaps 86 upon the movement of the wheel 85, allow rollers 89 on the ends of the levers 87 to move inward under the action of the spring on the jacquard needles, as will be herein more fully described.

I prefer to cause the drum 16 to take up its position by means of a selector mechanism which sets a stop in a suitable position. This may be effected in many ways and I wish to emphasize the fact that one way about to be described must only be taken as representative, as many schemes and systems may be devised which come within the scope of the invention.

90 is a plate fixed to the stationary spindle 83. To a projecting pin upon this plate is attached one end of a coiled spring 91 the other end being fastened to the boss of the drum 16. The spring keeps the drum pulled in the direction of the arrow 92 Fig. 18. When the movement in a reverse direction is taking place two pins 93 projecting from the drum engage with and cause the drum to be carried around by the wheel 85. Upon the return the spring assists the return of the solenoid or actuating piston controlling the rack. 94 is a stop on the casing against which a projecting pin or roller 95 is adapted to take.

96 is a magnet controlling the escapement 97 of the spring-controlled selector wheel 98. This wheel is provided with two sets of teeth one set 99 on its surface and one set 100 on its outer edge. The escapement gears with the teeth 99, while the pawl 101, Fig. 17, carried by a rod 102 working in a bearing engages with the teeth 100. The rod 102 carries at its outer end a lever actuated by a spring-controlled rod 103 which is provided with a ball and cup 104 at the lower end. The ball works upon a cam boss of a spring-controlled plate 105 capable of a slight longitudinal movement against the spring 106, but incapable of rotation. The plate 105 carries at its outer end two projections 107, which may carry horizontal rollers and upon the inside of the wheel 85 two corresponding projections 108 are provided so that upon the wheel in its rotation bringing the projections together, the plate 105 is forced inward. This causes the ball to ride upon the cam like boss and raise with it the rod 103, which brings the pawl 101 out of engagement with the teeth 100.

The action is as follows:—Assuming that some of the needles are in holes in the drum 16 it follows that the drum is locked against movement. In this position the notches 86 on the setting wheel 85 are in engagement with the rollers 89, as some of the pins are in the drum. The parts are so proportioned and arranged that in this position the lugs 107 and 108 are coincident and thus the pawl 101 is clear of the teeth 100. It is of course to be understood that the letter, numeral or the like is being exhibited by the unit and when it is desired to set the selector into a new position the required number of impulses is sent and the selector stop 109, Fig. 17, is set through a certain angular distance by means of the escapement. To exhibit this fresh setting the gear wheel 84 is first actuated and caused to move the setting wheel 85 in a clockwise direction—see Fig. 18. Upon the first movement the stops 107 and 108 come out of coincidence and thus cause the pawl 101 to engage with the teeth 100. The setting wheel catches against the pin 93 and carries the drum around with it, the pins having been previously withdrawn by the rollers 89, being forced outward by the rotating incline of the slots 86. Upon continued movement the pin or roller 95 comes into contact with the stop 94 and thus finishes the movement. The locking pawl 101 has, in the meantime, been slipping over teeth 100 on the selector wheel, which has remained, being locked by its escapement catch from movement in that direction, in the position in which it was set. When the rack operating the wheel 84 and consequently the wheel 85 commences its return movement, these wheels rotate in a counter-clockwise direction and the spring 91 causes the drum 16 to follow. As the pawl 101 moves with the drum 16 it carries around with it the selector wheel (winding up the selector spring) until the stop 109 on the selector comes into contact with the fixed stop 110 on the magnet framing. This is actually the zero position of the selector as will be understood. The selector wheel not being able to move farther it follows that the drum 16 is also stopped with the required holes opposite the particular pins or needles it is required to operate. Nothing further happens however, until the rollers 89 traveling down the inclined slot 86 permit the said needles to enter the holes and thus by their movement actuate their particular strips, pieces or the like forming the letter, numeral, etc., it is desired to set.

Figures 24, 26:
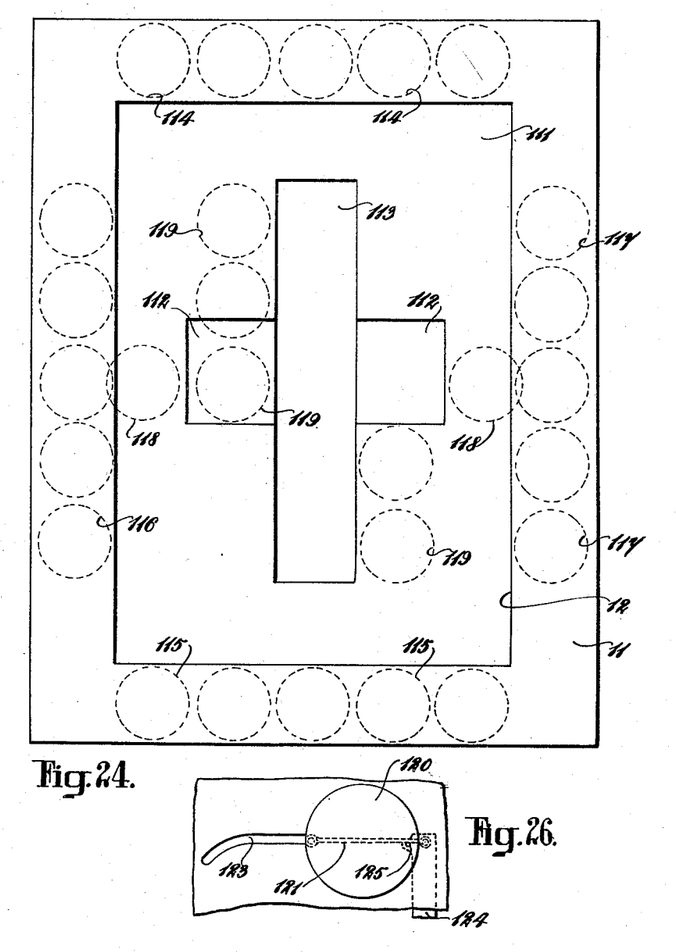
Figs. 24 and 25 are diagrams of a modified form of unit with the parts in different positions.
Figs. 26 and 27 show, in front elevation and sectional plan, respectively, details of Figs. 24 and 25.
Figure 25:
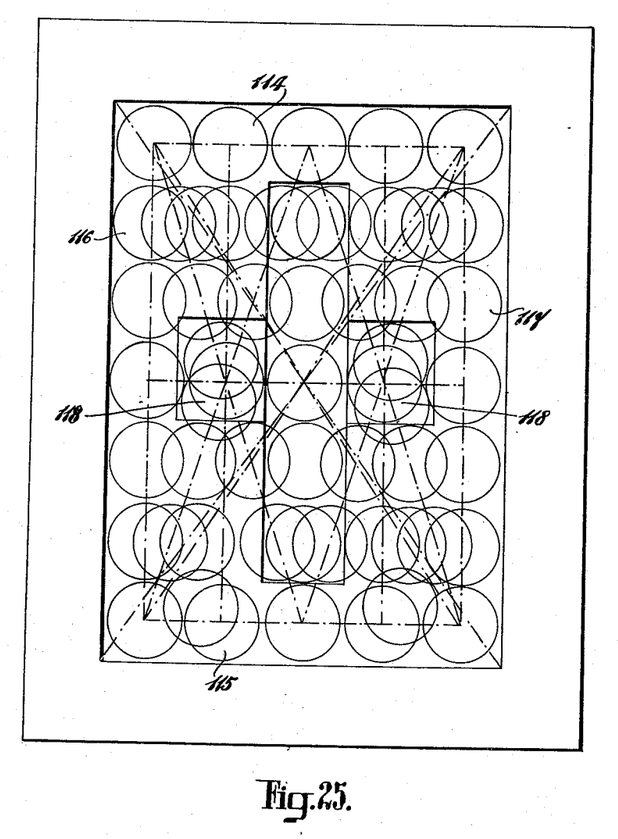
Figure 27:
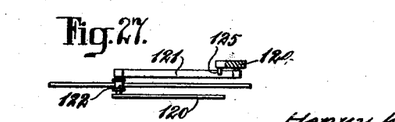

Figs. 24 and 25 show diagrams of modified forms of a device, wherein circular, hexagonal or other suitably shaped plates, disks or the like may be operated upon the same principles as the strips, etc., previously described. In these figures 11 is the outer mask plate provided with the aperture 12. The inner mask plate 111 is provided with a cruciform aperture the sides of which support between them a series of baffle mask plates 112. 114, 115, 116 and 117 are disks the movement of which are controlled by suitable mechanisms, which are located at the top, bottom and sides, beneath the plate 11, and capable of being brought from beneath this plate on to the plate 111. The disks 118 are located behind the plate 111 at the center of each side and in a plane between this plate and the plates 112 while five other disks 119 come beneath the plates 112, and above the plate 113. It will thus be seen that all the disks can be brought into sight and selected to make any desired letter, numeral or the like. The disks may be moved in any required way, a long or short distance by appropriate mechanism. In some cases to form perfect letters it is necessary to deflect some of the disks. One method of effecting this is shown in Figs. 26 and 27, where 120 is the disk connected by means of a pin to a flat spring or spring arm 121 coming on either side of the mask plate. 122 is a roller on the spring which works in a curved slot. The spring is connected to the actuating lever 124 which is also provided with a stop pin 125 for the spring arm to press against in the normal position. It will be understood that when the disk is moved along the slot, it is deflected from the straight direction and this improves the appearance of the letter, numeral or the like.

Figure 28:
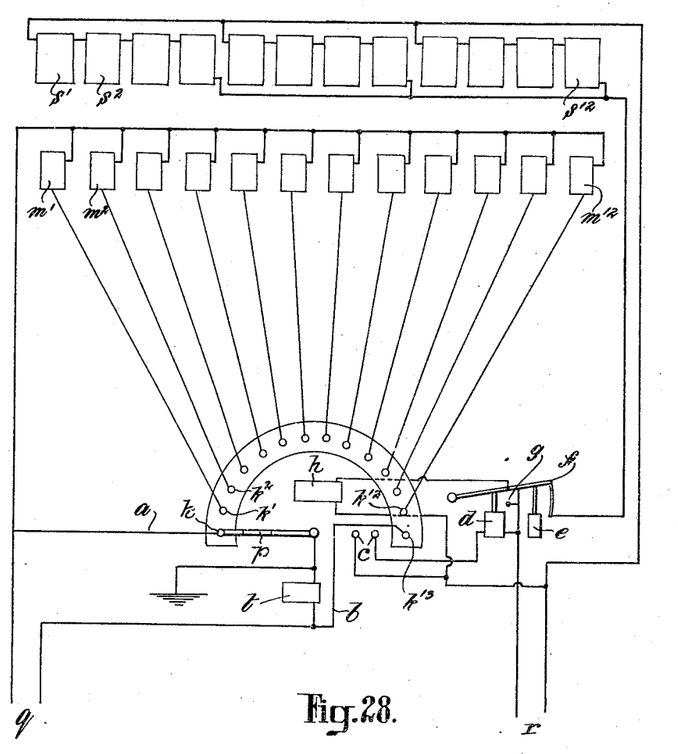
Fig. 28 is a diagram showing one method of connecting up an indicating unit system.

The diagram at Fig. 28 shows, as previously mentioned, one method of connecting up an electrically operated indicating unit system of the class described. The mechanism is one provided with a unit switching selector of the type described in connection with some of my previous patents for advertising devices. In the diagram 12 units are employed. $s^1$ $s^2$ $s^{12}$ are the setting solenoids, $m^1$ $m^2$ $m^{12}$ are the selector magnets of the units, $k^1$ $k^2$ $k^{12}$ are the corresponding contacts for the selector magnets. $p$ is the contact arm which may be moved forward in a clockwise direction against the action of a spring and brought back from the last contact to the first when released, or which may be moved in a clockwise direction by means of an escapement. The lines pass away at $q$ to the transmitting station. $r$ is a local supply circuit. On starting to set the selectors the arm $p$ moves to the first contact $k^1$ and after the selector in the first unit has been brought into position, the arm is moved on by the selector setting magnet $t$ to the next contact $k^2$, and this operation continues until the arm has passed the last contact $k^{12}$. The arm $p$ then closes the local circuit at $c$ from the local supply through a solenoid $d$ of a slow return relay which may be controlled by a device of the dash pot type $e$, or of some other type. The arm $f$ closes a local contact which is long and operates the setting solenoids $s^1$ to $s^{12}$ of the units. These solenoids may be connected up in any suitable way. They are shown connected in series parallel groups. After the arm $f$ has reached the end of its downward movement it closes the contact $g$ to the solenoid or release magnet $h$, which winds up the unit switch selector, if it is an escapement, in setting, or releases it if it is an escapement for returning; the arm $p$ therefore, returns to the first contact. This may close a circuit for working an indicating device at the control station, showing the operator that the cycle of operations is completed. When the arm $p$ is upon the contact $k^{13}$, a signal light, for instance a red light may be shown in the transmitting station and at the same time the sending mechanism may be automatically locked. Again, when the arm $p$ returns to the first contact $k$, another suitable light, for instance a green light may be lighted in the exhibiting station, to indicate that the cycle is complete, and the selectors may be re-set. It is to be observed that the magnet $t$ has a high resistance winding, so that is is not interfered with by the low voltage currents for the circuits $b$, so that the two circuits are separated. When large numbers of units are employed, I may provide an extra unit switching-selector (that is a switching selector which itself switches in different unit selectors).

It will be understood that the particular methods of constructing the advertising devices herein described with reference to the accompanying drawings and the particular methods of operating the same may be varied without departing from the principle of my invention.

What I claim as my invention and desire to secure by Letters Patent of the United States of America is:—

1. An apparatus for making public announcements, exhibiting advertisements, and for other purposes of a like nature, comprising a unit having an exhibiting surface, the exhibiting surface consisting of a plurality of plates located in parallel planes so as to leave spaces between the said plates, and members for forming the outlines of a letter or other character, the said members being of a different color from that of the exhibiting surface, means upon which the said members are mounted, whereby they may be moved in planes parallel to the exhibiting surface from a concealed position through the spaces between the said plates of the exhibiting surface into a visible position and into a position relative one with another to constitute the outline of the required character, and means for bringing the said members into and out of the visible position, substantially as described.

2. An apparatus for making public announcements, exhibiting advertisements, and for other purposes of a like nature, comprising a unit having an exhibiting surface, the exhibiting surface consisting of a plurality of plates located in parallel planes so as to leave spaces between the said plates, flat plates adapted when brought into certain relative positions to form the outline of a desired character, the said plates being of a different color from that of the exhibiting surface, operating means connected with the said plates for moving the said plates in planes parallel to the exhibiting surface from a concealed position through the spaces between the first mentioned plates into a position to form and exhibit the desired character, and mechanism for controlling the movement of the said operating means.

3. An apparatus for making public announcements, exhibiting advertisements, and for other purposes of a like nature, comprising a casing, a number of plates arranged in said casing and located in parallel planes and forming an exhibiting surface or background, the said plates having spaces between the same, and a plurality of flat plates forming parts of letters or other characters, and mounted to move in planes parallel to the exhibiting surface, the said plates in one position passing through the spaces between the plates forming the exhibiting surface, and being brought into position relative to one another to form letters or other characters and in another position being withdrawn through the spaces between the plates of the exhibiting surface so as to be concealed.

4. An apparatus for making public announcements, exhibiting advertisements, and for other purposes of a like nature, comprising a casing, a number of plates located in parallel planes in said casing so as to leave spaces between the plates, the said plates forming an exhibiting surface or background, a plurality of flat plates forming parts of letters or other characters movably arranged in said casing and adapted to be passed through the spaces between the plates of the exhibiting surface into exhibiting position and into position relative one with another to form letters or other characters, or to be withdrawn through said spaces and concealed, operating members located in the casing and carrying said character forming plates, and means for controlling said operating members, to cause the same to move the desired plates into or out of the exhibiting position.

5. An apparatus for making public announcements, exhibiting advertisements, and for other purposes of a like nature, comprising an exhibiting unit having a casing, plates arranged in said casing in parallel planes so as to leave spaces between the plates, the said plates forming an exhibiting surface or background, a plurality of flat plates of different shapes movably arranged in said casing and forming parts of letters or other characters, and operating means connected with each of said plates for moving the same in planes parallel to the exhibiting surface and into appropriate relative positions one with another to form any required character.

6. An apparatus for making public announcements, exhibiting advertisements, and for other purposes of a like nature, comprising a casing, plates arranged in said casing in parallel planes so as to leave spaces between the plates, the said plates forming an exhibiting surface or background, a plurality of flat plates movably arranged in said casing and constituting parts of letters or other characters, operating mechanisms connected with said plates for moving the same in planes parallel with the exhibiting surface and into appropriate relative positions to form any required letter or other character, and a jacquard mechanism for bringing said operating mechanisms into action.

7. An apparatus of the character described, comprising an exhibiting unit having a casing, plates arranged in said casing in parallel planes so as to leave spaces between the plates, the said plates forming an exhibiting surface or background, a plurality of flat plates arranged in said casing, lever mechanisms connected with said plates and adapted to move the same in planes parallel with the exhibiting surface from a concealed position into an exhibiting position relative to said background, and into appropriate relative positions to form the required letter or other character, spring controlled needles connected with said lever mechanisms and having axial movement, a jacquard drum having recesses for engagement by certain of said needles when the recesses in the drum are opposite the same to cause the lever mechanisms to bring the desired plates into exhibiting position, and means for removing the needles from the recesses in the drums, whereby the lever mechanisms are caused to move the plates into concealed position.

8. In an apparatus of the character described, the combination with a casing having an opening in its front, plates arranged in said casing and forming a background, and a plurality of members adapted to be brought into exhibiting position relative to said background and into appropriate positions relative one with another to form a desired letter or other character, of operating means connected with said members for moving the same into and out of exhibiting position, mechanism connected with said operating means for controlling the same, and a selector mechanism for determining the position of said controlling mechanism.

9. In an apparatus of the character described, the combination with a casing having an opening in its front, plates in said casing forming an exhibiting surface or background, and a plurality of members adapted to be brought into exhibiting position relative to said background and into appropriate positions relative one with another to form a desired letter or character, of operating means connected with said members for determining the position of the same, jacquard mechanism, including a drum having recesses, and needles for engaging said recesses for controlling the said operating means, the drum being movable to different positions for controlling particular operating means and the members connected therewith, and a selector mechanism for determining the position of the jacquard drum.

10. In an apparatus of the character described, a casing having an opening at the front, plates arranged in said casing in parallel planes and forming an exhibiting surface or background, a plurality of flat plates adapted to be brought from a concealed position relative to said background into an exhibiting position and into appropriate positions relative one with another to form letters or other characters, lever mechanisms connected with said flat plates for operating the same, a jacquard drum mounted to turn and having recesses of different depths in its periphery, spring controlled needles connected with said lever mechanisms and adapted to engage the said recesses in the jacquard drum, mechanism controlling said needles to permit certain of the needles to engage the appropriate recesses in the drum and to remove said needles from the drum when the latter is to be turned to another position, a selector mechanism including a spring controlled selector wheel for determining the position of the drum, and electrical means for controlling the position of said selector wheel.

In testimony whereof I affix my signature in presence of two witnesses.

HENRY KINGSFORD HARRIS.

Witnesses:
A. E. VIDAL,
C. CARRIGAN.

Copies of this patent may be obtained for five cents each, by addressing the "Commissioner of Patents, Washington, D. C."